March 11, 1930.  B. ROLLMAN  1,750,432
PRESS
Original Filed Nov. 16, 1925  2 Sheets-Sheet 1

Inventor
Bruce Rollman,
By Paulmin Paulmin
Attorneys

March 11, 1930.　　　　B. ROLLMAN　　　　1,750,432
PRESS
Original Filed Nov. 16, 1925　　2 Sheets-Sheet 2
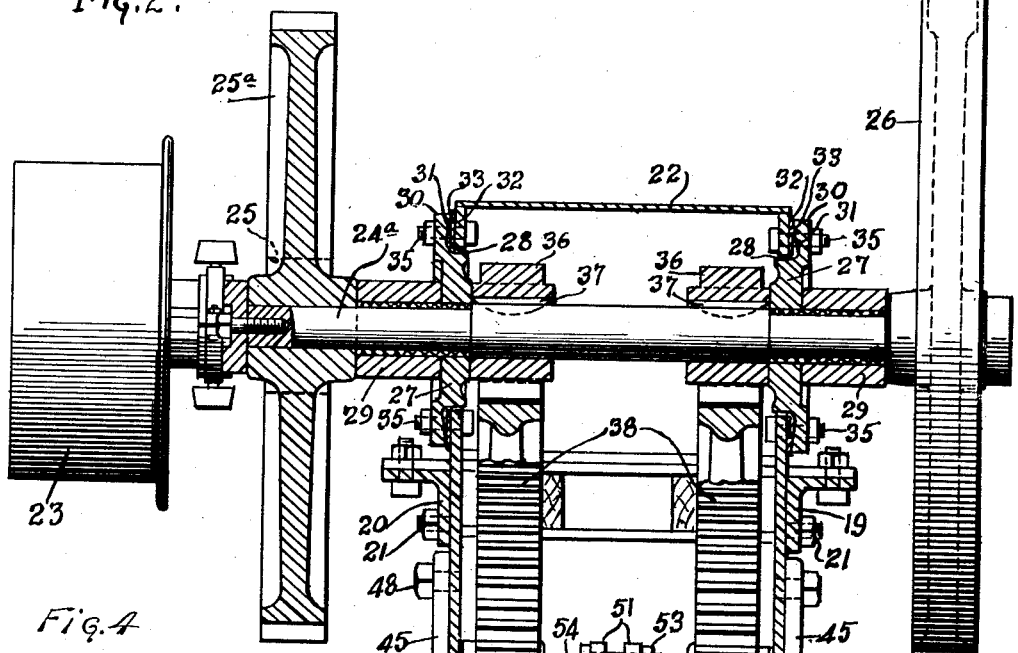
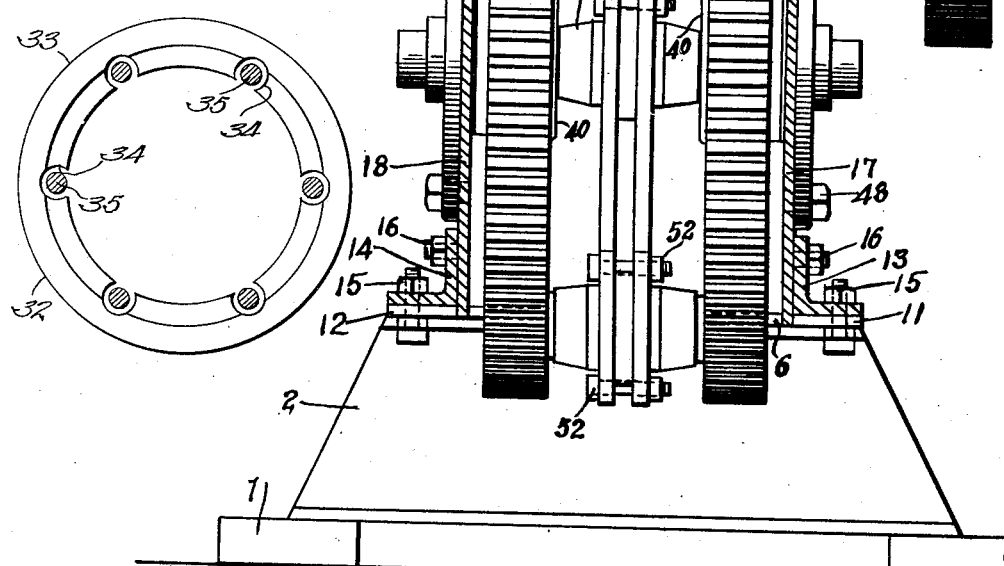
INVENTOR
Bruce Rollman,
By Taulmin Taulmin
ATTORNEYS Patented Mar. 11, 1930

1,750,432

UNITED STATES PATENT OFFICE

BRUCE ROLLMAN, OF BELLEVUE, OHIO, ASSIGNOR TO THE OHIO CULTIVATOR COMPANY, OF BELLEVUE, OHIO, A CORPORATION OF OHIO

PRESS

Original application filed November 16, 1925, Serial No. 69,392. Divided and this application filed May 3, 1926. Serial No. 106,335.

My invention relates to presses and in particular to a press for the baling of paper or other finely divided and fragmentary material, and is a division of my application, Serial No. 69,392, filed November 16, 1925.

It is the object of my invention to provide means in a bearing mechanism for maintaining the driving or driven shaft or both in suitable alignment and for aligning them easily when the machine is assembled, which greatly reduces the necessity for careful manufacture and the expense thereof. While the bearing mechanism is shown with the driven shaft only it may be used with the driving shaft or any other shaft.

It is an additional object to provide a novel feature of construction of the frame in that side plates extend from the bottom of the machine above the upper rail where they are used as supports for the bearings of the shafts, both for the driving shafts and the driven shafts.

In the accompanying drawings:

Figure 2 is a section on line 2—2 of Figure 1 showing the driven shaft and the method of adjusting it in its horizontal position with reference to the rest of the mechanism.

Figure 3 is a section through the wedge ring used in the adjustment of the bearings and shaft position, such as shown in Figure 2.

Figure 4 is a plan view of this ring showing the apertures for the clamping bolts.

Figure 1:
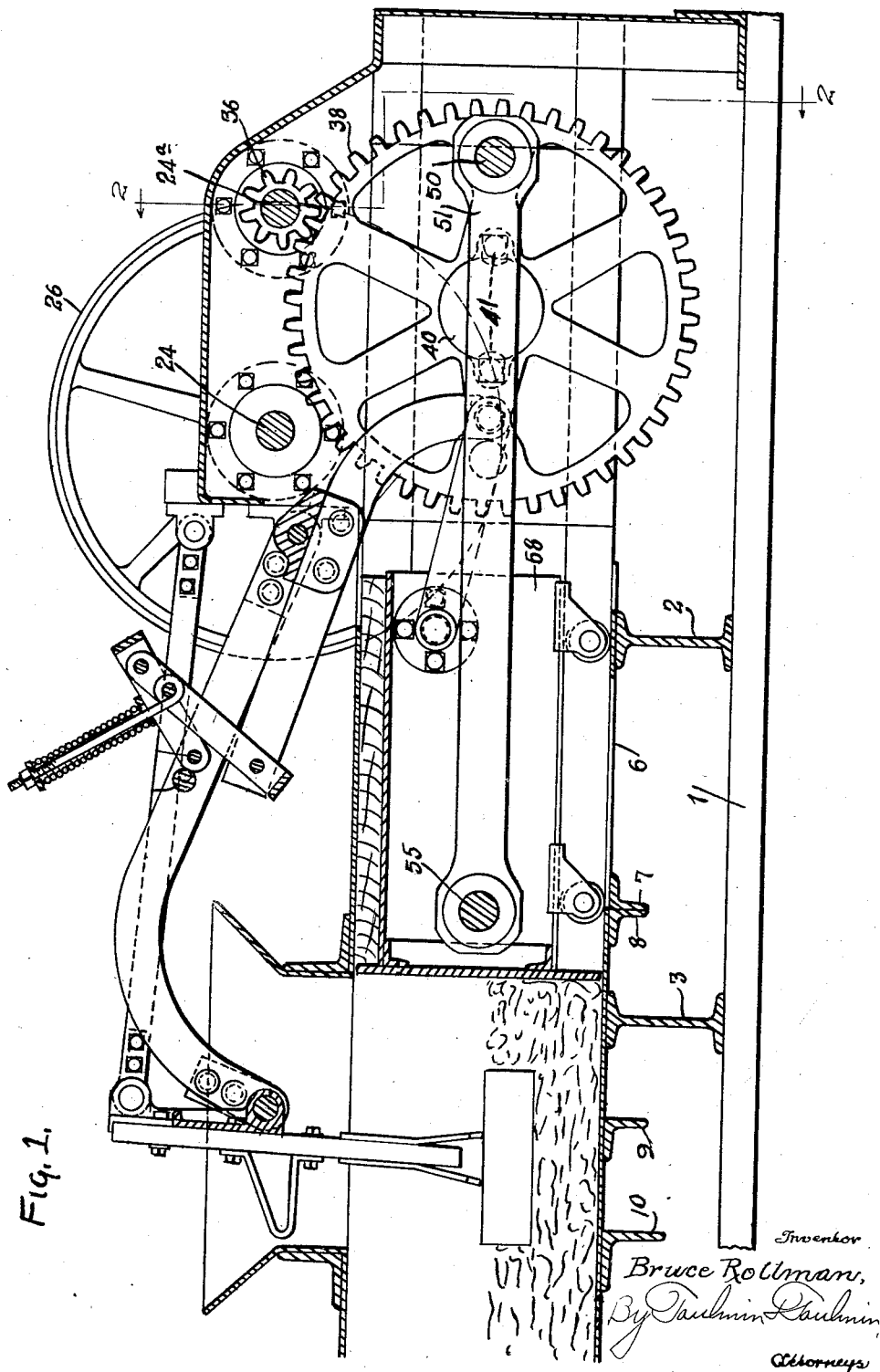
Figure 1 is a longitudinal section of a press showing the driving shaft and driven shaft.

The invention is fully illustrated in Figures 2, 3 and 4. Figure 2 shows a cross section of the press showing the driven shaft and the disks 27 for adjustably mounting and supporting this shaft. This figure also shows the driving pulley 23 and the flywheel 26 mounted on the driving shaft 24. The relative position of the driving shaft and the driven shaft will be understood from an examination of Figure 1. The sole purpose and object of this invention is the provision of bearing mechanism consisting of the disk 27, the wedge disk 32 and their related parts.

Referring to the drawings in detail, 1 is a base or platform on which is mounted the press. A plurality of transverse I-beams, 2 and 3, are arranged transversely on this platform for the purpose of supporting the bottom plate 6. This plate is further reenforced by a plurality of transverse angle irons, 7, 8, 9 and 10. Side rails 11 and 12 of the plate 6 are provided on this support, longitudinally, upon which members 11 and 12 are the angle irons or rails 13 and 14 which are supported and bolted by the bolts 15. To these lower rails 13 and 14 are bolted by the bolts 16 the side plates 17 and 18. These side plates extend upwardly within and above upper rails 19 and 20, which are bolted thereto by the bolts 21. These side plates are capped at their upper end by a plate 22.

23 designates a driving pulley which is driven by a belt from any suitable source of power. This pulley is mounted upon the driving shaft 24 which carries the driving pinion which drives a driven gear 25$^a$ on the driven shaft 24$^a$. On the other end of the shaft 24 is a flywheel 26. The shaft 24$^a$ is journaled in a plate 27, the inner margins of which rest upon the shoulders 28 of the side plate. As these side plates are roughly formed and as the disks 27 are likewise relatively roughly formed, it may result that the driving shaft is not in its proper position in a suitable horizontal plane. In order to prevent the necessity for a heavy, perfectly manufactured structure for this purpose which would be prohibitive in its expense, I provide the following arrangement for adjusting this driving shaft in its horizontal plane, so that it will turn in its bearings 29 in the plane desired.

The disk 27 is provided with flanges 30 having concave faces 31. Between this concave face and the side plate is a wedge disk 32 having a wedge margin with a convex surface 33. This disk is provided with slots internally disposed, designated 34, through which the bolts 35 pass for retaining the several members together in position on the side plate. Thus, if it is desired to change the angularity of the driving shaft to the horizontal plane, a shifting of this wedge plate upwardly or downwardly will effect the desired end. Bolts can then be clamped and the structure will be held in the desired position.

On this driven shaft 24ª are a pair of spaced pinions 36, held in position by the keys 37 in the conventional way. These pinions engage with their respective gears 38. These gears are mounted on suitable shafts carried by the side plates. The gears 38 are known as the pitman gears. They are mounted upon bearings in plates 45. The plates 45 are bolted to the side plates 17 and 18 by the bolts 48.

On the rim of each gear is an aperture carrying the end of a cross pin 50, on which is journaled a pair of plates 51 constituting the pitman. These plates are bolted together by the bolts 52. A similar arrangement is found at the other end of the pitman which are bolted together by the bolts 53 on a sleeve 54 mounted on a cross pin 55 which is journaled in the bearings in the vertical plates 58, which constitute a portion of the plunger.

It will be understood that the means of adjusting the horizontal position of the driven shaft may be also used in connection with the driving shaft. It can be used with the other shafts, as desired.

It will be also understood that I desire to comprehend within my invention such modification as may be necessary to adapt it to varying conditions and uses.

Having thus fully described my invention, what I claim as new and desire to secure by Letters Patent, is:

1. In a baler, a base, lower rails and upper rails on either side of said base spaced from one another, and side plates extending from the lower rails upwardly on either side above the upper rails, and a driven shaft supported in the portions of the side plates above said upper rails, and means consisting of a detachable plate and a wedge-shaped disk in said side plates for adjusting the horizontal position of said driven means, said detachable plate being supported by said side plate.

2. In a baler, a base, lower rails and upper rails on either side of said base spaced from one another, and side plates extending from the lower rails upwardly on either side above the upper rails, and a driven shaft supported in the portions of the side plates above said upper rails, and means in said side plates for adjusting the horizontal position of said driven shaft, said adjusting means consisting of a bearing plate having a concave inwardly disposed bearing flange and a wedge disc having a convex adjacent marginal portion whereby as the wedge disc is shifted vertically or horizontally it will change the position of the driving and driven means carried thereby.

3. In a baler, a base, lower rails and upper rails on either side of said base spaced from one another, and side plates extending from the lower rails upwardly on either side above the upper rails, and a driven shaft supported in the portions of the side plates above said upper rails, and means in said side plates for adjusting the horizontal position of said driven shaft, said adjusting means consisting of a bearing plate having a concave inwardly-disposed bearing flange and a wedge disc having a convex adjacent marginal portion whereby as the wedge disc is shifted vertically it will change the position of the driven shaft carried thereby, retaining means such as bolts adapted to pass through said bearing plate, wedge disc and side walls, said wedge disc having slots for permitting the vertical movement of the wedge disc with reference to said bolts.

4. In a shaft support, a supporting member, a bearing plate having a shoulder adapted to be projected therethrough and rocking therein, a shaft supported by said bearing member, a wedge disc interposed between said support and a flange of said bearing member, said flange having an internally-disposed convex portion engaging therewith, said wedge disc being formed in a ring with a larger interior diameter than the hub of the bearing plate adapting the wedge disc to be suspended vertically relative thereto for adjustment either horizontally or vertically.

5. In a shaft support, a supporting member, a bearing plate having a shoulder adapted to be projected therethrough and rocking therein, a shaft supported by said bearing member, a wedge disc interposed between said support and a flange of said bearing member, said flange having an internally disposed concave portion and a wedge having an internally disposed convex portion engaging therewith, said wedge disc being formed in a ring with a larger interior diameter than the hub of the bearing plate adapting the wedge disc to be suspended vertically relative thereto, and retaining means passing through said supporting wedge disc and flange of the bearing member, said wedge disc having slots for permitting its vertical adjustment over said bolts.

In testimony whereof, I affix my signature.

BRUCE ROLLMAN.